(12) United States Patent
Liu

(10) Patent No.: US 8,119,733 B2
(45) Date of Patent: Feb. 21, 2012

(54) REACTIVE MONOMERIC SURFACTANTS

(75) Inventor: Leo Zhaoqing Liu, Lawrenceville, NJ (US)

(73) Assignee: Rhodia Operations, Aubervilliers (FR)

( * ) Notice: Subject to any disclaimer, the term of this patent is extended or adjusted under 35 U.S.C. 154(b) by 655 days.

(21) Appl. No.: 11/729,396

(22) Filed: Mar. 28, 2007

(65) Prior Publication Data

US 2007/0270508 A1 Nov. 22, 2007

Related U.S. Application Data

(60) Provisional application No. 60/787,356, filed on Mar. 30, 2006.

(51) Int. Cl.
*C08F 2/16* (2006.01)
*C08F 2/18* (2006.01)
*C08F 2/22* (2006.01)
*C08F 2/24* (2006.01)
*C08G 73/02* (2006.01)

(52) U.S. Cl. .......... 524/800; 524/801; 528/60; 528/360; 528/361; 516/53

(58) Field of Classification Search .................. 524/800, 524/801; 528/360, 361, 60; 516/53
See application file for complete search history.

(56) References Cited

U.S. PATENT DOCUMENTS

| | | | |
|---|---|---|---|
| 3,532,663 A | 10/1970 | Nicks et al. | |
| 4,268,410 A * | 5/1981 | Allan et al. | 516/74 |
| 4,285,720 A | 8/1981 | Scher | 504/112 |
| 4,414,127 A * | 11/1983 | Fu | 510/115 |
| 4,938,797 A | 7/1990 | Hasslin et al. | 504/359 |
| 4,944,802 A * | 7/1990 | Chagnon et al. | 524/113 |
| 5,180,498 A | 1/1993 | Chen et al. | 210/697 |
| 5,527,468 A | 6/1996 | Boyette et al. | 210/698 |
| 5,631,341 A | 5/1997 | Morishima et al. | |
| 5,837,290 A | 11/1998 | Hasslin | 424/489 |
| 5,851,980 A * | 12/1998 | Avery | 510/424 |
| 5,866,153 A | 2/1999 | Hasslin et al. | 424/408 |
| 5,997,682 A * | 12/1999 | Goodman et al. | 156/273.7 |
| 6,262,152 B1 | 7/2001 | Fryd et al. | 524/90 |
| 6,391,923 B1 | 5/2002 | Pollmann et al. | 514/714 |
| 6,475,474 B1 * | 11/2002 | Ricca | 424/70.1 |
| 2004/0197357 A1 * | 10/2004 | Heming et al. | 424/401 |
| 2004/0266558 A1 * | 12/2004 | Kuntimaddi et al. | 473/373 |
| 2006/0194708 A1 * | 8/2006 | Barthel et al. | 510/337 |

FOREIGN PATENT DOCUMENTS

| | | | |
|---|---|---|---|
| GB | 1444933 A | | 8/1976 |
| JP | 9-286851 | | 11/1997 |
| WO | 9803065 | | 1/1998 |
| WO | WO 00/12662 | * | 3/2000 |
| WO | 0020520 | | 4/2000 |
| WO | WO 02/100525 | | 12/2002 |
| WO | 2006097690 | | 9/2006 |

OTHER PUBLICATIONS

Sakai, E. et al , Molecular Structure and Dispersion-Adsorption Mechanisms of Comb-Type Superplasticizers Used in Japan, Journal of Advanced Concrete Technology 2003, 1 (1) 16025.
Zubov, V.P. et al , Reactivity of Allyl Monomers in Radical Polymerization, Journal of Macromolecular Science, Chemistry, 1979, A13(1), 111-31.
Bevington, J.C. et al Journal of Macromolecular Science, Pure and Applied Chemistry 2001, A38(7), 624-640.
Plessis, C. et al, Intramolecular Chain Transfer to Polymer in Emulsion Polymerization of 2-Ethylhexyl Acrylate, 2001.
Ahmad, N.M. et al , Chain Transfer to Polymer in Free-Radical Solution Polymerization of n-Butyl Acrylate Studied by NMR Spectroscopy, Macromolecules 1998, 31, 2822-2827.
Glossary of Basic Terms in Polymer Science (IUPAC Recommendations 1996), Pure Appl. Chem., vol. 68, No. 12, pp. 2287-2311, 1996.

\* cited by examiner

*Primary Examiner* — James J Seidleck
*Assistant Examiner* — Deve E Valdez

(57) ABSTRACT

A polymer network, comprises an interfacially polymerized reaction product derived from a surfactant monomer.

12 Claims, No Drawings

REACTIVE MONOMERIC SURFACTANTS

This application claims the benefit of U.S. Provisional Application No. 60/787,356, filed Mar. 30, 2006.

FIELD OF THE INVENTION

This invention relates to reactive monomeric surfactants and their use in stabilizing aqueous liquid emulsions and aqueous particle dispersions.

BACKGROUND OF THE INVENTION

Use of reactive polymeric surfactants having hydrophilic and hydrophobic substituent groups in the formation of emulsions is known, as illustrated in WO 02/100525. The use of "structured polymers" having hydrophilic and hydrophobic substituent groups in the formation of dispersions is also known (U.S. Pat. No. 6,262,152). In each case, the relevant polymers are difficult or expensive to produce industrially and/or lack of sufficient surfactant-like properties. Some of the processes for using these polymers involved metal-containing catalyst, which can be difficult to remove from the product and can be a concern with respect to industrial hygiene and environment. Furthermore, reactive polymeric surfactant containing a hydrophilic substituents derived from methoxy polyethylene glycol methacrylate (MPEGMA), can be produced at a relatively lower cost, but tend to be unstable under alkaline conditions. MPEGMA co-polymers typically lack sufficient surfactant properties.

There is a need to have a surfactant system that possesses sufficient surfactant properties, can be manufactured economically, is resistant to hydrolysis under alkaline conditions, and is environment friendly.

SUMMARY OF THE INVENTION

In a first aspect, the present invention is directed to a polymer network, comprising the interfacially polymerized reaction product of a surfactant monomer.

In a second aspect, the present invention is directed to a method for stabilizing an emulsion of a discontinuous liquid phase in a continuous liquid phase, wherein one of such phases comprises an aqueous liquid and the other of such phases comprises a water immiscible liquid, comprising:
(a) providing a surfactant monomer at an interface between the discontinuous liquid phase and the continuous liquid phase, and
(b) reacting the surfactant monomer to form a polymer network at the interface.

In a third aspect, the present invention is directed to an emulsion, comprising:
(a) an aqueous liquid phase,
(b) a water immiscible liquid phase, there being at least one interface between the aqueous liquid phase and the water immiscible liquid phase, and
(c) a polymer network disposed at the at least one interface, wherein said polymeric network comprises an interfacially polymerized reaction product derived from a surfactant monomer.

In a fourth aspect, the present invention is directed to a method for stabilizing a dispersion of solid particles in an aqueous medium, comprising:
(a) providing a surfactant monomer at an interface between the solid particles and the aqueous medium, and
(b) reacting the surfactant monomer to form a polymer network at the interface.

In a fifth aspect, the present invention directed to an aqueous dispersion comprising:
(a) an aqueous medium, and
(b) one or more particles dispersed in the liquid medium, said particles each having a particle core, said particle cores each having an outer surface, and said particles each having a polymer network disposed on at least a portion of the outer surface of the particle core, wherein said polymeric network comprises an interfacially polymerized reaction product derived from a surfactant monomers.

DETAILED DESCRIPTION OF INVENTION AND PREFERRED EMBODIMENTS

As used herein, the term "alkyl" means a saturated hydrocarbon radical hydrocarbon radical, which may be straight or branched, such as, for example, methyl, ethyl, n-propyl, iso-propyl, n-butyl, sec-butyl, t-butyl, pentyl, n-hexyl.

As used herein, the term "cycloalkyl" means a saturated ($C_5$-$C_{22}$)hydrocarbon radical that includes one or more cyclic alkyl rings, such as, for example, cyclopentyl, cyclooctyl, and adamantanyl.

As used herein, the term "hydroxyalkyl" means an alkyl radical, more typically a ($C_1$-$C_{22}$)alkyl radical, that is substituted with a hydroxyl groups, such as for example, hydroxymethyl, hydroxyethyl, hydroxypropyl, and hydroxydecyl.

As used herein, the term "aminoalkyl" means an alkyl radical, more typically a ($C_1$-$C_{22}$)alkyl radical, that is substituted with an amino group, such as aminobutyl.

As used herein, the term "glycidalalkyl" means an alkyl radical, more typically a ($C_1$-$C_{22}$)alkyl radical, that is substituted with a glycidal group, such as glycidalethyl.

As used herein, the term "carboxyalkyl" means an alkyl radical, more typically a ($C_1$-$C_{22}$)alkyl radical, that is substituted with a carboxy group, such as for example, carboxyethyl.

As used herein, the term "alkylene" means a bivalent acyclic saturated hydrocarbon radical, including methylene, polymethylene, and alkyl substituted polymethylene radicals, such as, for example, dimethylene, tetramethylene, and 2-methyltrimethylene.

As used herein, "oxyalkylene" means bivalent radical comprising an alkylene radical that is substituted with an oxy group, such as, for example, oxymethylene, and oxydimethylene.

As used herein, the term "alkenyl" means an unsaturated straight chain, branched chain, or cyclic hydrocarbon radical that contains one or more carbon-carbon double bonds, such as, for example, ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl.

As used herein, the term "aralkyl" means an alkyl group substituted with one or more aryl groups, such as, for example, phenylmethyl, phenylethyl, triphenylmethyl.

As used herein, the terminology "($C_r$-$C_s$)" in reference to an organic group, wherein r and s are each integers, indicates that the group may contain from r carbon atoms to s carbon atoms per group.

As used herein, the terminology "ethylenic unsaturation" means a terminal (that is, α, β) carbon-carbon double bond.

As used herein, the term "(meth)acrylates" in reference to a compound refers collectively to the acrylate and methacrylate analogs of such compound. For example a reference to ethylhexyl (meth)acrylate means ethylhexyl acrylate and its ethylhexyl methacrylate analog.

As used herein, the terminology "surfactant" means a compound that when dissolved in an aqueous medium lowers the surface tension of the aqueous medium.

As used herein, each of the terms "monomer", "polymer", "copolymer", "random copolymer", "alternating copolymer", "block copolymer", and "graft copolymer", has the meaning ascribed to it in Glossary of basic terms in polymer science (IUPAC Recommendations 1996), *Pure Appl. Chem.*, Vol. 68, No. 12, pp. 2287-2311, 1996.

As used herein, an indication certain substituent group of an embodiment of the invention is "as described above" refers separately to each previous description, including the broadest description and any narrower descriptions, of such substituent group that is applicable in the context of that embodiment.

The surfactant monomer component of the present invention may be any monomeric compound having at least one hydrophilic group, at least one hydrophobic group, and at least two reactive functional groups per molecule, where the reactive groups may each independently be a part of a hydrophilic moiety or a hydrophobic group. The surfactant monomer may be a single compound or may comprise a mixture of surfactant monomer compounds.

Suitable hydrophobic moieties include, for example, hydrocarbon substituent groups, such as alkyl, alkenyl, aryl, and aralkyl groups.

Suitable hydrophilic moieties include, for example, anionic, cationic, and nonionic substituent groups.

Suitable nonionic substituent groups include, for example, poly(oxyalkylene) groups, glucoside groups, and poly(glucoside) groups.

Suitable anionic groups include, for example, acid groups and acid salt groups. Suitable acid groups include, for example, carboxyalkyl groups. Suitable acid salt groups include, for example, carboxylate salt groups, such as —R$^1$COO$^-$X$^+$, sulfonate salt groups, such as —R$^2$SO$_3^-$X$^+$, sulfate salt groups such as —R$^3$OSO$_3^-$, phosphonate salt groups, such as —R$^4$PO$_3^{-2}$ 2X$^+$, and phosphate salt groups such as —R$^5$OPO$_3^{-2}$2X$^+$, wherein R$^1$, R$^2$, R$^3$, R$^4$, R$^5$, and R$^6$ are each absent or alkyl, and X$^+$ is in each case a cation, such as Na$^+$, P$^+$, and ammonium ions.

Suitable cationic substituent groups include, for example, quaternary ammonium salt groups, such as those according to formula (I):

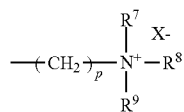

(I)

wherein:
R$^7$, R$^8$, and R$^9$ are each independently alkyl, an acid group or an acid salt group, and
X$^-$ is an anion, such as Cl$^-$.

Suitable reactive functional groups include, for example, hydroxyl, hydroxyalkyl, amino, aminoalkyl, carboxyl carboxyalkyl, glycidal, isocyanato, and glycidal alkyl groups.

It will be appreciated that a given substituent group of a surfactant monomer may serve more than one function and fall within more than one of the above described categories of hydrophilic group, hydrophobic group, reactive functional group, and ionic group, for example, an acid salt group provide an anionic site as well as a reactive site that may be used as a crosslinking site by, as described below, reaction with a suitable crosslinker.

In one embodiment, the surfactant monomer comprises one or more compounds having at least one hydrophilic group, at least one hydrophobic group, and at least two, more typically at least three, reactive functional groups per molecule, where the reactive groups may each independently be a part of a hydrophilic moiety or a hydrophobic group, the surfactant monomer is reacted to form the polymer network, and the polymer network comprises the polymerized reaction product of the surfactant monomers.

In one embodiment, the surfactant monomer comprises three or more isocyanate functional groups per molecule and the surfactant monomer reacts with water and other molecules of the same surfactant monomer compound to form a polymer network that is crosslinked by urea linkages between monomeric units derived from the surfactant monomer In one embodiment, the isocyanate-functional surfactant monomer comprises one or more aromatic rings and the isocyanate functional groups are each attached to a respective aromatic ring member carbon atom. In one embodiment, the surfactant monomer further comprises a poly(alkoxyl) substituent.

In one embodiment, the surfactant monomer comprises a water dispersible isocyanate-functional surfactant monomer according to formula (II):

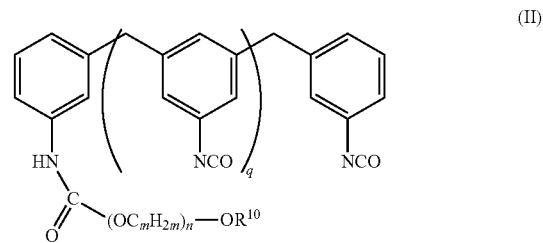

(II)

wherein R$^{10}$ is an organic group that does not react with the NCO groups of the compound, m is 2, 3, or 4, n is an integer of from 1 to 100, and q is an integer of from 0 to 6, more typically from 0 to 4.

In one embodiment, R" is a hydrocarbon group, even more typically (C$_1$-C$_6$)alkyl.

In another embodiment, the reaction mixture further comprises a reactive polymeric surfactant having reactive functional groups that are reactive with the reactive functional groups of the surfactant monomer and the polymer network comprises the reaction product of the surfactant monomer and the reactive polymeric surfactant.

In one embodiment, the surfactant monomer is reacted by crosslinking the surfactant monomer with a crosslinking agent for the surfactant monomer and the polymer network comprises the crosslinked reaction product of the surfactant monomer and the crosslinking agent for the surfactant monomer.

In one embodiment, the surfactant monomer is an alkylamide monomer according to formula (III):

$$R^{10}-\overset{O}{\overset{\|}{C}}-\overset{H}{\underset{}{N}}-\overset{H_2}{\underset{}{C}}-\overset{H_2}{\underset{}{C}}-N\begin{cases}H_2C-\overset{OH}{\underset{H}{C}}-\overset{H_2}{\underset{}{C}}-SO_3^-Na^+\\H_2C-CH_2-OH\end{cases} \quad (III)$$

wherein $R^{10}$ is a hydrophobic group.

In one embodiment, the surfactant monomer is an alkylamine or alkylether amine according to formula (IV) or (V):

$$R^{11}NH(CH_2CH_2CH_2NH)_nCH_2CH_2CH_2NH_2 \quad (IV)$$

$$R^{12}O(CH_2CH_2CH_2NH)_{n'}CH_2CH_2CH_2NH_2 \quad (V)$$

wherein $R^{11}$ and $R^{12}$ are each independently hydrophobic groups and n and n' are each integers of from 1 to about 50.

In another embodiment, the surfactant monomer comprises a compound according to formula (VI):

$$HO_3S-C_2H_4-\overset{}{\underset{R^{13}}{CH}}\!\!\begin{array}{l}HN-(CH_2)_m-\overset{H}{\underset{}{N}}-(CH_2)_n-NH_2\end{array} \quad (VI)$$

wherein $R^{13}$ is a hydrophobic group, and m and n are each independently integers of from 2 to 4.

In one embodiment, the surfactant monomer comprises a compound according to structure (VII):

$$H(OC_2H_4)_r-O\qquad O-(C_2H_4O)_pH\\ \qquad\qquad \diagdown\!\!\diagup \\ \qquad\qquad O\qquad CH-\overset{H_2}{\underset{}{C}}-O-\overset{O}{\overset{\|}{C}}-R^{14}\\ \qquad\qquad\qquad\qquad\quad\underset{}{O-(C_2H_4O)_qH} \quad (VII)$$

wherein $R^{14}$ is a hydrophobic group, and p, q, and r are each integers, wherein the sum of p+q+r is from about 0 to about 200.

The reactive functional groups of the surfactant monomer provide reactive sites for crosslinking using a suitable crosslinking agent. For example:

hydroxyl groups provide crosslinking sites for reaction with an isocyanate-functional crosslinking agent amino groups provide crosslinking sites for reaction with isocyanate-acetoacetoxy-, aldehyde-, or epoxide-functional crosslinkers, acid groups provide crosslinking sites for reaction with isocyanate-, aziridine-, or carbodiimide-functional crosslinking agents, epoxide groups provide crosslinking sites for reaction with amino-functional crosslinking agents.

Suitable crosslinking agents for the surfactant monomer are compounds having two or more functional groups per molecule that are capable of reacting with functional groups of the surfactant monomer.

In one embodiment, the surfactant monomer comprises two or more reactive functional groups per molecule, the crosslinking agent comprises two or more reactive functional groups per molecule that are reactive with the reactive functional groups of the monomer, and at least one of the surfactant monomer and crosslinking agent comprises three or more reactive functional groups per molecule.

In an embodiment wherein the monomer comprises two reactive functional groups per molecule, the crosslinking agent comprises three or more functional groups per molecule that are reactive with the reactive functional groups of the monomer.

In an embodiment wherein the monomer comprises three or more reactive functional groups per molecule, the crosslinking agent comprises two or more functional groups per molecule that are reactive with the reactive functional groups of the monomer.

In one embodiment, the polymer network is formed by using a second surfactant monomer having reactive groups that are reactive with the reactive groups of a first surfactant monomer as a crosslinking agent for the first surfactant monomer.

In an embodiment wherein the surfactant monomer and the reactive polymeric surfactant comprise two or more functional groups per molecule, the polymer network of the present invention is derived by reaction of surfactant monomer and the reactive polymeric surfactant of the present invention with an isocyanate-functional crosslinking agent. Suitable isocyanate-functional crosslinking agents include, for example, such as diisocyanate, m-tetramethylxylene diisocyanate, hexamethylene diisocyanate trimer, toluene diisocyanate, isophorone diisocyanate.

In one embodiment, the polymer network is formed by using a water dispersible monomer having reactive groups that are reactive with the reactive groups of a first surfactant monomer as a crosslinking agent for the first surfactant monomer.

In one embodiment, the surfactant monomer and the reactive polymeric surfactant comprises hydroxyl functional groups and crosslinking agent comprises a water dispersible surfactant monomer according to formula (II).

In one embodiment, the surfactant monomer and the reactive polymeric surfactant comprises hydroxyl functional groups and crosslinking agent comprises a water dispersible surfactant monomer according to formula (VIII):

$$\begin{array}{c}O\diagdown\!\!\diagup O(C_2H_4)_s-OCH_3\\\overset{\|}{C}\\|\\(CH_2)_6\\|\\O\!\!=\!\!\overset{}{\underset{}{\diagdown}}\overset{N}{\underset{}{\diagup}}\!\!=\!\!O\\\overset{|}{\underset{}{N}}\qquad\overset{|}{\underset{}{N}}\\OCN-(H_2C)_6\diagup\overset{}{\underset{O}{\diagdown}}(CH_2)_6-NCO.\end{array} \quad (VIII)$$

In one embodiment, the reaction mixture further comprises a reactive polymeric surfactant having reactive functional groups that are reactive with the reactive functional groups of the surfactant monomer, with the reactive functional groups of the crosslinking agent, or with the reactive functional groups of the surfactant monomer and the reactive functional groups of the crosslinking agent, and the polymer network is the crosslinked reaction product of the surfactant monomer, reactive polymeric surfactant, and the crosslinking agent.

In one embodiment, a catalyst is used to promote the desired crosslinking reaction. Suitable catalysts for promoting reaction of an isocyanate-functional crosslinker with a hydroxyl-functional reactive polymeric surfactant include, for example, dibutyl tin dilaurate, tributyl amine, trioctyl amine, and tridodecyl amine. The catalyst may be the surfactant monomer or the polymeric reactive surfactant.

The aqueous phase of the emulsion and dispersion of the present invention comprises water, more typically greater than about 30% by weight (wt %) water, more typically greater than about 50 wt % water, and optionally may further comprise one or more water miscible organic solvents, such as for example, ($C_1$-$C_8$)alkanols, such as for example, methanol, ethanol, hexanol, and mixtures thereof.

In one embodiment, the emulsion of the present invention is an emulsion of a discontinuous aqueous phase in a continuous second liquid phase.

In one embodiment, the emulsion of the present invention is an emulsion of a discontinuous second liquid phase in a continuous aqueous liquid phase.

In one embodiment, the emulsion of the present invention further comprises solid water insoluble or partially water soluble particles dispersed, more typically dispersed and suspended, in the aqueous phase and or the second liquid phase of the emulsion. Compositions comprising a continuous liquid phase, a suspended solid phase and an emulsified liquid phase and are typically termed "suspoemulsions".

In one embodiment, the second liquid phase comprises a water immiscible liquid, such as a hydrocarbon solvent, a herbicide, insecticide, fungicide, bactericide, plant growth regulator, fertilizer, dye, ink, or pharmaceutical active ingredient.

In one embodiment, the discontinuous phase is in the form of droplets, at least a portion of which are each encapsulated within a substantially continuous shell of the polymer network.

In one embodiment, the dispersion of the present invention is a dispersion of solid water insoluble or partially water soluble particles.

In one embodiment, the particle core comprises a solid pesticide, herbicide, insecticide, fungicide, bactericide, plant growth regulator, fertilizer, dye, ink, or pharmaceutical active ingredient.

In one embodiment, the particles comprise a solid particle core is surrounded by a substantially continuous shell of the polymer network.

In one embodiment, the polymer network is formed in the aqueous medium by an interfacial polymerization process.

In one embodiment, the emulsion of the present invention is made by:

mixing together a reaction mixture comprising continuous aqueous phase, a surfactant monomer and a water immiscible liquid to disperse the water immiscible liquid as a discontinuous phase in the continuous aqueous phase, and reacting the surfactant monomer with the crosslinking agent at the interface between the aqueous phase and the discontinuous second liquid phase to form the polymer network.

In one embodiment, the reaction mixture further comprises a crosslinking agent for the surfactant monomer.

In another embodiment, the reaction mixture for making the emulsion further comprises a reactive polymeric surfactant having reactive functional groups that are reactive with the reactive functional groups of the surfactant monomer, the reactive functional groups of the crosslinking agent (in those embodiments in which a crosslinking agent is used), or the reactive functional groups of the surfactant monomer and the reactive functional groups of the crosslinking agent, and the polymer network is the crosslinked reaction product of the surfactant monomer and reactive polymeric surfactant, or of the surfactant monomer, reactive polymeric surfactant, and the crosslinking agent.

In one embodiment, the reaction mixture comprises from about 30 to about 95 parts by weight ("pbw") of an aqueous medium, from about 5 to about 70 pbw water immiscible liquid, from about 0.05 to about 20 surfactant monomer per 100 pbw water immiscible liquid, from 0 to about 20 wt % reactive polymeric surfactant per 100 pbw water immiscible liquid. The reaction mixture may optionally further include other components, such as other surfactants. In one embodiment, the reaction mixture further comprises from about 0.05 pbw to about 20 pbw crosslinking agent for the surfactant monomer per 100 pbw of water immiscible liquid.

In one embodiment, the dispersion of the present invention is made by:

mixing together a reaction mixture comprising continuous aqueous phase, a surfactant monomer according to the present invention and water insoluble particles to disperse particles in the continuous aqueous phase, and reacting the surfactant monomer with the crosslinking agent at the interface between the aqueous phase and the particles to form the polymer network on the surfaces of the particles.

In one embodiment, the reaction mixture further comprises a crosslinking agent for the surfactant monomer.

In another embodiment, the reaction mixture form making the dispersion further comprises a reactive polymeric surfactant having reactive functional groups that are reactive with the reactive functional groups of the surfactant monomer, the reactive functional groups of the crosslinking agent (in those embodiments in which a crosslinking agent is used), or the reactive functional groups of the surfactant monomer and the reactive functional groups of the crosslinking agent and the polymer network is the crosslinked reaction product of the surfactant monomer and reactive polymeric surfactant, or of the surfactant monomer, reactive polymeric surfactant, and the crosslinking agent.

In one embodiment, the reaction mixture comprises from about 30 to about 95 parts by weight ("pbw") of an aqueous medium, from about 70 to about 5 pbw water immiscible liquid, from about 0.05 to about 20 surfactant monomer per 100 pbw water immiscible liquid, from 0 to about 20 wt % reactive polymeric surfactant per 100 pbw water immiscible liquid. The reaction mixture may optionally further include other components, such as other surfactants. In one embodiment, the reaction mixture further comprises from about 0.05 pbw to about 20 pbw crosslinking agent for the surfactant monomer per 100 pbw of water immiscible liquid.

Reactive polymeric surfactants suitable for use in the processes according to the present invention are known compounds. Typically, the reactive polymeric surfactant comprises hydrophilic groups, hydrophilic groups, and reactive functional groups, which may each independently be part of the hydrophilic or hydrophobic groups.

In one embodiment, a reactive polymeric surfactant comprises one or more hydrophilic monomeric units per molecule, each independently according to formula (IX):

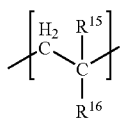

(IX)

wherein:

$R^{15}$ is H or methyl, $R^{16}$ is a hydrophilic group, and one or more hydrophobic monomeric units per molecule, each independently according to formula (X)

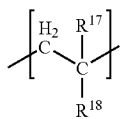

(X)

wherein:

$R^{17}$ is H or methyl, $R^{18}$ is a hydrophobic group, and one or more monomeric units per molecule, each independently according to formula (XI):

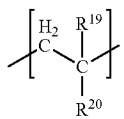

(XI)

wherein $R^{19}$ is H or methyl, and $R^{20}$ is a reactive functional group, provided that the monomeric groups according to formula (VII) may be absent if the hydrophilic groups or hydrophobic groups of the reactive polymeric surfactant comprises reactive functional groups.

In one embodiment, $R^{16}$ is a hydroxyl terminated poly (oxyalkylene) ester or ether group.

In one embodiment, $R^{18}$ is $R^{21}$ or

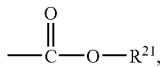

and $R^{21}$ is alkyl, cycloalkyl, aryl, or aralkyl.

In one embodiment, $R^{20}$ is alkenyl, aminoalkyl, hydroxyalkyl, glycidalalkyl, a quaternary ammonium salt group, an acid group, an acid salt group, or

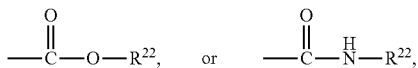

and $R^{22}$ is H, aminoalkyl, hydroxyalkyl, glycidal alkyl, a quaternary ammonium salt group, an acid group, or an acid salt group.

Suitable quaternary ammonium salts include those according to:

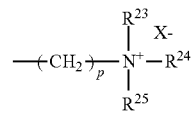

wherein:

$R^{23}$, $R^{24}$, and $R^{25}$ are each independently alkyl, carboxyalkyl, an alkyl sulfonic acid salt group, or an carboxylic acid salt group, an acid salt group, and $X^-$ is an anion, such as $Cl^-$.

In one embodiment, the reactive polymeric surfactant comprises, based on the total number of monomeric units of the surfactant, from about 20 to about 90 percent by weight ("wt %"), more typically from about 40 to about 80 wt %, and even more typically from about 50 to about 70 wt %, hydrophilic monomeric units according to formula (IX), from about 10 to about 80 wt %, more typically from about 20 to about 60 wt %, and even more typically from about 30 to about 50 wt %, hydrophobic monomeric units according to formula (X), from about 0 to about 30 wt %, more typically from about 0 to about 20 wt %, and even more typically from about 0 to about 10 wt %, reactive monomeric units according to formula (XI), In one embodiment, the reactive polymeric surfactant exhibits a weight average molecular weight ("$M_w$") of from about 1,000 to about 200,000 grams per mole ("g/mol"), more typically from about 2,000 to about 100,000 g/mol, and even more typically from about 5,000 to about 50,000 g/mol. $M_w$ is typically determined by fractionating a solution of the polymer using, for example, size exclusion chromatography, and then determining the molecular weight of each of such polymer fractions, for example, by measuring the intensity of light scattering by the fractions or by measuring the refractive index of the fractions and comparing the refractive index results to those obtained for a polymer of known molecular weight.

The reactive polymeric surfactant may be a random copolymer, an alternating copolymer or a graft copolymer, or a block copolymer.

The polymer network of the present invention is made by interfacial polymerization using know polymerization techniques. Methods for making suitable random and block polymers are known in the art, such as, for example, by known free radical polymerization processes or by known controlled free radical polymerization processes, such as reversible addition fragmentation transfer (RAFT), macromolecular design via interchange of xanthates (MADIX), using ethylenically unsaturated monomers.

Example 1 and Comparative Example C1

The emulsion of Example 1 was made as follows. 3.2 grams of sodium cocoampho hydroxypropylsulfonate (37% active in water, known as Miranol™ CS conc, (Rhodia Inc.) was dissolved in 56 grams of water, and homogenized with 36 grams of soybean oil at 2000 rpm for 2 minutes. Then 1.5 grams of hexamethylene diisocyanate trimer, known as Tolonate™ HDT 90B (Rhodia Inc.), and 0.03 gram of dibutyltin dilaurate in 1.5 gram of xylene was added and homogenization was continued for another 1 minute. The emulsion so prepared was heated at 60-70° C. for 30 minutes. The emulsion was stable without phase separation.

The emulsion of Comparative Example C1 was prepared by an analogous process, except without the isocyanate. The emulsion of Comparative Example C1 was phase separated after few hours.

Example 2

The emulsion of Example 2 was made as follows. Hydroxyethylcellulose (known as Cellosize™ QP 100 MH, Dow Chemical Company) was dispersed in 60 grams of water and stirred with 0.02 grams of sodium carbonate to yield a viscous solution. Then ethoxylated sorbitan laurate of 80 mole of ethylene oxide (known as Alkamuls™ PSML 80/72, Rhodia Inc) 0.65 gram and Sodium cocoampho hydroxypropylsulfonate (37% active in water, Miranol™ CS conc, Rhodia Inc.) 1.10 grams was dissolved into the solution. This aqueous solution was then homogenized with a mixture of 1.2 grams of hydrophilic grafted hexamethylene diisocyanate oligomer (known as Bayhydur™ 2336, Bayer Corporation) and 0.02 grams of dibutyltin dilaurate in 40 grams of soybean oil at 2000 rpm for 2 minutes in the presence of 0.05 grams of silicone defoamer (Rhodasil™ Antifoam 481 PEX, Rhodia Inc.). The emulsion was stable without phase separation for days. Dilution of the emulsion with tap water ten times showed no indication of phase separation.

Example 3

The hydrophilic grafted diisocyanate oligomer of Example 3 was made as follows.

Hexamethylene diisocyanate trimer, known as Tolonate™ HDT LV2 from Rhodia, 60 grams was mixed with methoxy polyethylene glycol of molecular weight 550 (MPEG 550, Dow Chemical Company) and dibutyltin dilaurate 0.01 gram. The mixture was heated at 80-90° C. for 4 hours. The colorless viscous liquid was dispersible in water.

Example 4

A reactive polymeric surfactant was made as follows.

To a 500 ml reaction flask equipped with mechanic stirrer, nitrogen inlet, condenser and thermometer was charged 100 grams of allyl alcohol ethoxylate (20 mols of EO per mole (APEG-20)). The reactor contents were heated to 110° C. over 45 to 60 minutes under nitrogent sparge and stirring. Mixing and sparging were each maintained through the reaction. Once the temperature reached 110° C., 2.0 grams of 16.67% 1,1'-azobis(cyanocyclohexane) (VaZo™ 88), solution in toluene, 0.15 gram of acrylic acid and 1.0 gram of ethylhexyl acrylate were added, followed by feeding simultaneously the mixture of 40.7 grams of ethylhexyl acrylate and 5.85 grams of acrylic acid over 3 hours and 10.0 grams of the above 1,1'-azobis(cyanocyclohexane) solution over 3 hours and 5 minutes. The reaction temperature were kept at 108-110° C. during the addition and extended to another hour. To eliminate any residual ethylhexyl acrylate, 0.50 grams of the above 1,1'-azobis(cyanocyclohexane) solution was added, the batch was kept at 110° C. for one hour. Toluene was then stripped in house vacuum. The product so prepared was soluble in water and is a good emulsifier as tested with toluene in water.

Example 5

Sodium cocoampho hydroxypropylsulfonate (37% active in water, Miranol™ CS conc, Rhodia Inc.) 0.11 grams and ethoxylated sorbitan laurate of 80 mole of ethylene oxide (known as Alkamuls™ PSML 80/72, Rhodia Inc)) 1.02 grams and the reactive polymeric polymer of Example 4 were dissolved in 60 grams of water, then homogenized with 40 grams of soybean oil containing 1.8 grams of the hydrophilic grafted diisocyanate oligomer of Example 3 at 2000 rpm for 3 minutes. The emulsion so prepared was heated at 60-65° C. for 3 hours. The emulsion so obtained was stable for days without phase separation.

Example 6

Methoxy polyethylene glycol (MPEG 550 from Dow Chemical) 50 parts, was heated to 90-100° C. under vacuum for about 2 hours to remove traces of water and then was mixed with polymethylene polyphenylisocyanate (PAPI 580 N from Dow Chemicals) 50 parts at room temperature. The mixture was heated at 90-100° C. for 1.5 hour. A light brown viscous liquid was obtained. The product is water-soluble.

Example 7

Methoxy polyethylene glycol (MPEG 750 from Dow Chemical) 135.0 parts, was heated to 90-100° C. under vacuum for about 1 hours to remove traces of water and then was mixed with polymethylene polyphenylisocyanate (PAPI 580 N from Dow Chemicals) 89.09 parts at room temperature. The mixture was heated at 90 to 100° C. for 3.5 hour. A light brown viscous liquid was obtained. The product is water-soluble.

Example 8

Methoxy polyethylene glycol (MW, 1100 known as Polyglykol™ M1100 from Clariant) 100 parts, was heated with Magnasol 5 parts at 90-100° C. under vacuum for about 2 hours to remove traces of water and salts and filtered. Purified MPEG 1100 of 84.2 parts was mixed with polymethylene polyphenylisocyanate (PAPI 580 N from Dow Chemicals) 39.7 parts at room temperature. The mixture was heated at 90 to 100° C. for 2.5 hour. A light brown viscous liquid was obtained. The product is water-soluble.

Example 9

Methoxy polyethylene glycol (MW 1100, known as Polyglykol M1100 from Clariant) 84.3 parts, and tristyrylphenol ethoxylate (known as Soprophor™ BSU from Rhodia) 41.85 parts were stirred with Magnisol™ 6.45 parts at 90 to –100° C. under vacuum for about 2 hours to remove traces of water and salts. After Magnisol was filtered out, the mixture, 99.0 parts was heat with polymethylene polyphenylisocyanate (pMDI, known as PAPI 580 N from Dow Chemicals) 50.0 parts at 90 to 100° C. for 3 hour. A light brown viscous liquid was obtained. The product is water-soluble.

Example 10

Hexamethylene diisocyanate trimer, known as Tolonate™ HDT LV2 from Rhodia, 82.4 grams was mixed with methoxy polyethylene glycol of molecular weight 1000 (known as Polyglykol M1000 from Clariant). The mixture was heated at 80 to 90° C. for 4 hours. The colorless viscous liquid was dispersible in water.

Example 11

Iron oxide red pigment 15 parts, warm water 100 parts, Jaguar HP-120 0.8 part and pMDI-MPEG550 from Example 6 (1/1 pMDI/MPEG550) 0.6 parts were homogenized at 40 to 50° C. for 2 minutes. The dispersion was stable without coagulation and sedimentation for months.

Example 12

Titanium dioxide pigment (Kronos Inc.) 134.5 parts, warm water (45° C.) 67.3 parts and pMDI-MPEG550 from Example 6, 4.2 parts were homogenized for 5 minutes. Then Jaguar HP-120 0.20 part was added. The dispersion was stable without coagulation and sedimentation for months.

Example 13

Distilled water 280 g, atrazine 235 g and pMDI-MPEG550 from example #6 (1/1 pMDI/MPEG550) 2.35 g was homogenized and then put into a Szegvari Attritor with 250 ml of 2 mm stainless steel beads. The mixture was milled at 440 rpm for 2 hours. Additional pMDI-MPEG550 1.6 g was added in portions every 30 minutes during milling to thin the dispersion. To further stabilize the dispersion, 100 g of the above milled dispersion was then homogenized with Rhodopol 23 (Rhodia Inc) 0.6 g, pMDI-MPEG550 0.5 g and distilled water 20 g. The dispersion so prepared was stable for months without aggregation at room temperature.

Example 14

Distilled water 176.5 g, atrazine 150.5 g, Jaguar HP-120 (Rhodia Inc) 0.25 g and pMDI-MPEG550 from Example 6 (1/1 pMDI/MPEG550) 0.75 g was put into a Szegvari Attritor with 500 ml of 2 mm stainless steel beads. The mixture was milled at 440 rpm for 1.5 hours. Additional pMDI-MPEG550 3.0 g was added in portions during milling to thin the dispersion. To further stabilize the dispersion, 200 g of the above milled dispersion was then homogenized with Rhodopol 23 (Rhodia Inc) 0.2 g and pMDI-MPEG550 above 1.2 g. The dispersion so prepared was stable for months at room temperature with slight phase separation, but no aggregation. Dynamic light scattering showed mean diameter of the particles as 6.5 μm.

Dispersion with additional pMDI-MPEG550 was also prepared. Thus 20 grams of the above dispersion was mixed with another 0.45 g pMDI-MPEG550 (1/1 pMDI/MPEG550) and then stood by at room temperature for 2 days. Small amount of this dispersion was air dried. The solid was then re-dispersed in water with stirring with no lumps.

Example 15

Distilled water 180 g, cypermethrin 150 g, Jaguar™ HP-120 (Rhodia Inc) 0.23 g and pMDI-MPEG550 from Example 6 (1/1 pMDI/MPEG550) 0.75 g was put into a Szegvari Attritor with 500 ml of 2 mm stainless steel beads. The mixture was milled at 440 rpm for 1.5 hours. Additional pMDI-MPEG550 3.09 g was added during milling to thin the dispersion. To further stabilize the dispersion, 150 g of the above milled dispersion was then homogenized with Rhodopol 23 (Rhodia Inc) 0.15 g and pMDI-MPEG550 0.6 g. The dispersion so prepared was stable for months at room temperature without aggregation and little phase separation. Dynamic light scattering showed mean diameter of the particles as 3 μm.

Example 16

Distilled water 230.7 g, bifenthrin 72.9 g, Jaguar HP-120 (Rhodia Inc) 0.50 g and pMDI-MPEG550 from example #6 (1/1 pMDI/MPEG550) 0.60 g was put into a Szegvari Attritor with 500 ml of 2 mm stainless steel beads. The mixture was milled at 440 rpm for 1.5 hours. Additional pMDI-MPEG550 2.24 g was added during milling to thin the dispersion. To further stabilize the dispersion, 145 g of the above milled dispersion was then homogenized with Rhodopol™ 23 (Rhodia Inc) 0.15 g and pMDI-MPEG550 0.68 g. The dispersion so prepared was stable for months at room temperature without aggregation. Dynamic light scattering showed mean diameter of the particles as 5 μm.

Examples 17-21

The emulsions of Examples 17-21 were made as described below, with charges as listed in the following table:

| Ex # | Oil | Amount | Veegum | Jaguar HP120 | Water | pMDI-MPEG550 | D, μm |
|---|---|---|---|---|---|---|---|
| 17 | Soybean Oil | 30 | 0.35 | 0.6 | 70 | 1.0 | 4.7 |
| 18 | Clomazone | 30 | 0.35 | 0.6 | 70 | 1.0 | — |
| 19 | Cypermethrine | 30 | 0.33 | 0.65 | 65 | 1.0 | 3.5 |
| 20 | Tetraconazol | 30 | 0.35 | 0.6 | 70 | 1.0 | — |
| 21 | S-Metalochlor | 30 | 0.35 | 0.4 | 70 | 1.0 | 3.1 | pMDI-MPEG550 from Example 6 (1/1 pMDI/MPEG550) was dissolved in oil phase, while veegum and hydroxypropylguar (Jaguar 120 from Rhodia Inc) was dissolved in water. The two phases were then homogenized at 40 to 50° C. The mean diameter of the particles (D) were estimated by dynamic light scattering. All emulsions were stable without phase separation, or sedimentation after several weeks at room temperature.

Example 22

Example 22 demonstrates the preparation of emulsions with both pMDI-MPEG550 and HDT-MPEG550 from Examples 6 and 3 respectively. Alkamuls™ PSML 80/72 (Rhodia Inc) 0.49 g, Mirapol™ CS (Rhodia Inc.) 0.40 g and hydroxypropylguar (Jaguar™ HP-120, from Rhodia Inc.) 0.40 g were dissolved in 70 g of water. Then pMDI-MPEG550 from example #6 1.0 g in 30.8 g of tetraconazol was homogenized at 50-60° C., for 3-5 minutes. Rhodosil™ Antifoamer 481 PEX (Rhodia Inc) 0.05 g was added to eliminate the foam generated. The emulsion was stirred for 10 minutes and then cooled to room temperature. HDT-MPEG550 0.60 g was then added, followed by Jaguar™ HP-120. The emulsion was homogenized for 1 minute. The mean diameter of the droplets was measured to be 1.9 μm by dynamic light scattering.

Example 23

Example 23 is similar to Example 22, but with clomazone. Alkamuls™ PSML 80/72 (Rhodia Inc) 0.48 g, Mirapol CS (Rhodia Inc.) 0.40 g and hydroxypropylguar (Jaguar™ HP-120, from Rhodia Inc.) 0.40 g were dissolved in 69 g of water. Then pMDI-MPEG550 from example #6, 1.05 g in 31 g of clomazone was homogenized at 50 to 60° C., for 3 to 5 minutes. Rhodosil™ Antifoamer 481 PEX (Rhodia Inc) 0.05 g was added to eliminate the foam generated. The emulsion was stirred for 10 minutes and then HDT-MPEG550 0.52 g was homogenized into the emulsion at 30 to 40° C., followed by Jaguar™ HP-120 0.20 g. The mean diameter of the droplets was measured to be 1.7 μm by dynamic light scattering.

Examples 24-27

These emulsions were prepared with pMDI-MPEG from Examples 6, 7, 8 or 9 respectively. Silicon oil 50 parts was mixed with 2 parts of the pMDI-MPEG from Examples 6, 7, 8 or 9 respectively and homogenized with 50 parts of water at 40 to 50° C. The emulsions so prepared were stable without oil separation.

Examples 27-31

These examples were similar to the corresponding Examples 24-27 except soybean oil was used instead of silicone oil with 30% oil phase and 3.33% corresponding pMDI-MPEGs. The emulsions so prepared were stable without oil separation.

Example 32

In this example commercial amine surfactant of N-tallow-1,3-diaminopropane from Akzo Nobel (known as Duomeen T) was used. N-tallow-1,3-diaminopropane 0.20 part was dissolved in water 35 parts was homogenized with 0.50 part pMDI-MPEG from Example 9 in 15 parts of soybean oil. The emulsion was stable without oil separation.

Example 33

Example 33 is similar to Example 32, but with silicon oil. N-tallow-1,3-diaminopropane 0.20 part was dissolved in water 25 parts was homogenized with 1.0 part pMDI-MPEG from Example 9 in 25 parts of silicone oil. The emulsion was stable without oil separation.

Example 34

Example 34 is similar to Example 32, but with HDT-MPEG from Example 10. N-tallow-1,3-diaminopropane 0.18 part was dissolved in water 30 parts was homogenized with 1.0 part HDT-MPEG from Example #10 in 30 parts of mineral spirit. The emulsion was stable without oil separation.

Example 35

Example 35 is similar to Example 34, except soybean was used instead of mineral spirit. The emulsion was stable without oil separation.

Example 36

Example 36 demonstrates the preparation of micro-encapsules. Warm water (40-50° C.) 40 parts was homogenized with 10 grams of fragrance mixture of "cucumber melon" from Givaudan, while pMDI-MPEG550 from example #9 (1/1 pMDI/MPEG550) 2.0 was added. Homogenization was continued at 40-50° C. for 3 minutes. After standby at room temperature for 3 days, the emulsion was examined under microscope. Nice spherical particles were observed with little rupture upon drying on the microscopic glass.

Example 37

This example demonstrates the preparation of suspoemulsion. Clomazone emulsion from Example 23, 1 part was mixed with atrazine suspension from Example 13, 1 part. This suspoemusion was stable with phase separation.

The invention claimed is:

1. A polymer network, comprising a reaction product made by interfacial polymerization at an interface between an aqueous liquid phase and a water immiscible liquid phase or a water insoluble particle of:
    (A) a surfactant monomer comprising one or more compounds selected from:
        (1) alkylamide monomers according to formula (III):

$$R^{10}-\overset{O}{\overset{\|}{C}}-\overset{H}{\underset{}{N}}-\overset{H_2}{\underset{}{C}}-\overset{H_2}{\underset{}{C}}-\overset{}{\underset{H_2C-CH_2-OH}{N}}-\overset{OH}{\underset{H}{\overset{|}{C}}}-\overset{H_2}{\underset{}{C}}-SO_3^-Na^+ \quad (III)$$

wherein $R^{10}$ is a hydrophobic group,
        (2) alkylamine or alkylether amine compounds according to formula (IV) or (V):
            wherein $R^{11}$ and $R^{12}$ are each independently hydrophobic groups and n and n' are each integers of from 1 to about 50,
        (3) compounds according to formula (VI):
            wherein
            $R^{13}$ is a hydrophobic group, and
            m and n are each independently integers of from 2 to 4, and
        (4) compounds according to structure (VII):
            wherein
            $R^{14}$ is a hydrophobic group, and
            p, q, and r are each integers, wherein the sum of p+q+r is from about 0 to about 200, and
    (B) an isocyanate-functional-crosslinking agent for the surfactant monomer, and
    (C) optionally, a reactive polymeric surfactant having reactive functional groups that are reactive with functional groups of the surfactant monomer, with the functional groups of the crosslinking agent, or with functional groups of the surfactant monomer and functional groups of the crosslinking agent.

2. The polymer network of claim 1, wherein isocyanate crosslinking agent comprises diisocyanate, m-tetramethylxylene diisocyanate, hexamethylene diisocyanate trimer, toluene diisocyanate, isophorone diisocyanate, or a water dispersible monomer having isocyanate functional groups.

3. The polymer network of claim 2, wherein water dispersible monomer having isocyanate functional groups is a reaction product of hexamethylene diisocyanate trimer or polymethylene polyphenylisocyanate and methoxy polyethylene glycol.

4. A polymer network, comprising a reaction product made by interfacial polymerization at an interface between an aqueous liquid phase and a water immiscible liquid phase or a water insoluble particle of:
    (A) a surfactant monomer comprising sodium cocoampho hydroxypropylsulfonate,
    (B) an isocyanate-functional crosslinking went for the surfactant monomer comprising hexamethylene diisocyanate trimer, and
    (C) optionally, a reactive polymeric surfactant having reactive functional groups that are reactive with functional groups of the surfactant monomer, with the functional groups of the crosslinking agent, or with functional groups of the surfactant monomer and functional groups of the crosslinking agent.

5. A polymer network comprising a reaction product made by interfacial polymerization at an interface between an aqueous liquid phase and a water immiscible liquid phase or a water insoluble particle of:
  (A) a surfactant monomer comprising a mixture of sodium cocoampho hydroxypropylsulfonate and ethoxylated sorbitan laurate,
  (B) an isocyanate-functional crosslinking agent for the surfactant monomer comprising a hydrophilic grafted hexamethylene diisocyanate oligomer, and
  (C) optionally, a reactive polymeric surfactant having reactive functional groups that are reactive with functional groups the surfactant monomer, with the functional groups of the crosslinking agent, or with functional groups of the surfactant monomer and functional groups of the crosslinking agent.

6. A polymer network comprising a reaction product made by interfacial polymerization at an interface between an aqueous liquid phase and a water immiscible liquid phase or a water insoluble particle of:
  (A) a surfactant monomer comprising a mixture of sodium cocoampho hydroxypropylsulfonate and ethoxylated sorbitan laurate,
  (B) an isocyanate-functional crosslinking agent for the surfactant monomer comprising a mixture of a reaction product of hexamethylene diisocyanate trimer and methoxy polyethylene glycol and a reaction product of polymethylene polyphenylisocyanate and methoxy polyethylene glycol, and
  (C) optionally, a reactive polymeric surfactant having reactive functional groups that are reactive with functional groups of the surfactant monomer, with the functional groups of the crosslinking agent, or with functional groups of the surfactant monomer and functional groups of the crosslinking agent.

7. The polymer network of claim 1, wherein the reactive polymeric surfactant comprises:
  (a) one or more hydrophilic monomeric units per molecule, each independently according to formula (IX):

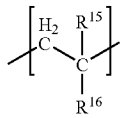

(IX)

wherein:
  $R^{15}$ is H or methyl,
  $R^{16}$ is a hydroxyl terminated poly(oxyalkylene) group, and
  (b) one or more hydrophobic monomeric units per molecule, each independently according to formula (X)

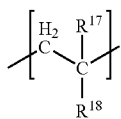

(X)

wherein:
  $R^{17}$ is H or methyl,
  $R^{18}$ is $R^{21}$ or

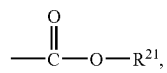

and $R^{21}$ is alkyl, cycloalkyl, aryl, or aralkyl.

8. The polymer network of claim 7, wherein the reactive polymeric surfactant comprises, based on the total number of monomeric units of the reactive polymeric surfactant, from about 20 to about 90 percent by weight of hydrophilic monomeric units according to formula (IX) and from about 10 to about 80 percent by weight of hydrophobic monomeric units according to formula (X).

9. The polymer network of claim 7, wherein the reactive polymer surfactant further comprises one or more monomeric units per molecule, each independently according to formula (XI):

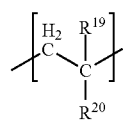

(XI)

wherein
  $R^{19}$ is H or methyl, and
  $R^{20}$ is alkenyl, aminoalkyl, hydroxyalkyl, glycidalalkyl, a quaternary ammonium salt group, an acid group, an acid salt group, or

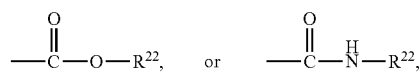

and $R^{22}$ is H, aminoalkyl, hydroxyalkyl, glycidal alkyl, a quaternary ammonium salt group, an acid group, or an acid salt group.

10. The polymer network of claim 9, wherein the reactive polymeric surfactant comprises, based on the total number of monomeric units of the reactive polymeric surfactant, from about 20 to about 90 percent by weight of hydrophilic monomeric units according to formula (IX), from about 10 to about 80 percent by weight of hydrophobic monomeric units according to formula (X), and up to about 30 weight percent monomeric units according to formula (XI).

11. The polymer network of claim 7, wherein the reactive polymeric surfactant has a weight average molecular weight of from about 1,000 to about 200,000 grams per mole.

12. A the polymer network, comprising a reaction product made by interfacial polymerization at an between an aqueous liquid phase and a water immiscible liquid phase or a water insoluble particle of:
  (A) a surfactant monomer comprising a mixture of sodium cocoampho hydroxypropylsulfonate and ethoxylated sorbitan laurate,
  (B) an isocyanate-functional crosslinking agent for the surfactant monomer comprising a water dispersible reaction product of hexamethylene diisocyanate trimer and methoxy polyethylene glycol, and
  (C) a reactive polymeric surfactant comprising a copolymer of allyl alcohol ethoxylate, ethylhexyl acrylate, and acrylic acid.

* * * * *